(12) United States Patent
Senovich et al.

(10) Patent No.: US 6,701,581 B2
(45) Date of Patent: Mar. 9, 2004

(54) CLAMP RETENTION DEVICE

(75) Inventors: Craig A. Senovich, Murfreesboro, TN (US); Ronald Todd Roberts, Mt. Juliet, TN (US); Scott D. Webb, Smyrna, TN (US)

(73) Assignee: Epicor Industries, Inc., Denver, CO (US)

( * ) Notice: Subject to any disclaimer, the term of this patent is extended or adjusted under 35 U.S.C. 154(b) by 0 days.

(21) Appl. No.: 10/215,681

(22) Filed: Aug. 10, 2002

(65) Prior Publication Data

US 2004/0025304 A1 Feb. 12, 2004

(51) Int. Cl.[7] .................. F16L 33/02; F16L 33/00
(52) U.S. Cl. .................. 24/20 R; 285/242; 285/252
(58) Field of Search .................. 24/20 R, 20 CW, 24/20 EE, 20 LS, 20 S; 248/74.1, 74.2; 285/23, 242, 252, 253, 337, 365

(56) References Cited

U.S. PATENT DOCUMENTS

| | | | | |
|---|---|---|---|---|
| 4,338,707 A | * | 7/1982 | Byerly | 24/542 |
| 4,882,814 A | * | 11/1989 | Takahashi | 24/20 R |
| 5,234,233 A | * | 8/1993 | Fix | 285/23 |
| 5,388,321 A | * | 2/1995 | Farrell | 29/447 |
| 5,622,391 A | * | 4/1997 | Belik | 285/23 |
| 5,630,255 A | * | 5/1997 | Eliasson | 24/274 R |
| 5,675,871 A | | 10/1997 | Webb et al. | |
| 5,820,166 A | * | 10/1998 | Webb | 285/23 |
| 5,915,739 A | | 6/1999 | Cradduck et al. | |
| 5,996,186 A | * | 12/1999 | Yamada et al. | 24/20 R |
| 6,088,886 A | * | 7/2000 | Gyongyosi | 24/279 |
| 6,343,772 B1 | * | 2/2002 | Oi | 248/75 |
| 2003/0159255 A1 | * | 8/2003 | Senovich et al. | 24/20 R |

\* cited by examiner

Primary Examiner—Robert J. Sandy
Assistant Examiner—André L. Jackson
(74) Attorney, Agent, or Firm—Gowlings LaFleur Henderson LLP

(57) ABSTRACT

A retention device is provided for positioning and retaining an open generally cylindrical hose clamp on a selected hose. The device extends generally about a longitudinal axis and has a retainer and a locator spaced axially from the retainer in side-by-side relationship. The locator and retainer are coupled together and the locator is adapted to hold the clamp while the retainer is adapted to engage the hose to maintain the device in position on the hose. The retainer is in the form of pair of looped hose engaging elements terminating at respective free ends and cantilevered to extend in opposite directions from a connecting web coupling the locator to the retainer.

4 Claims, 4 Drawing Sheets

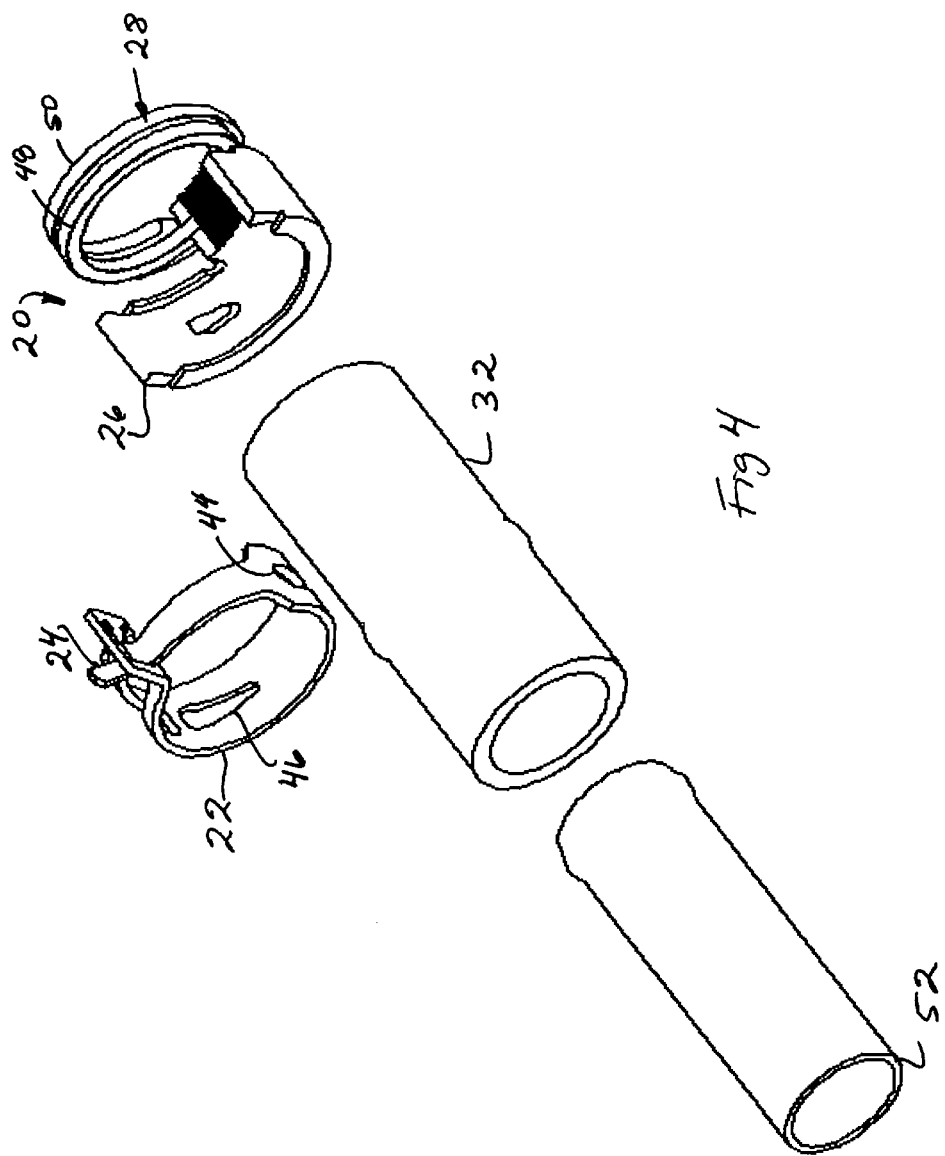

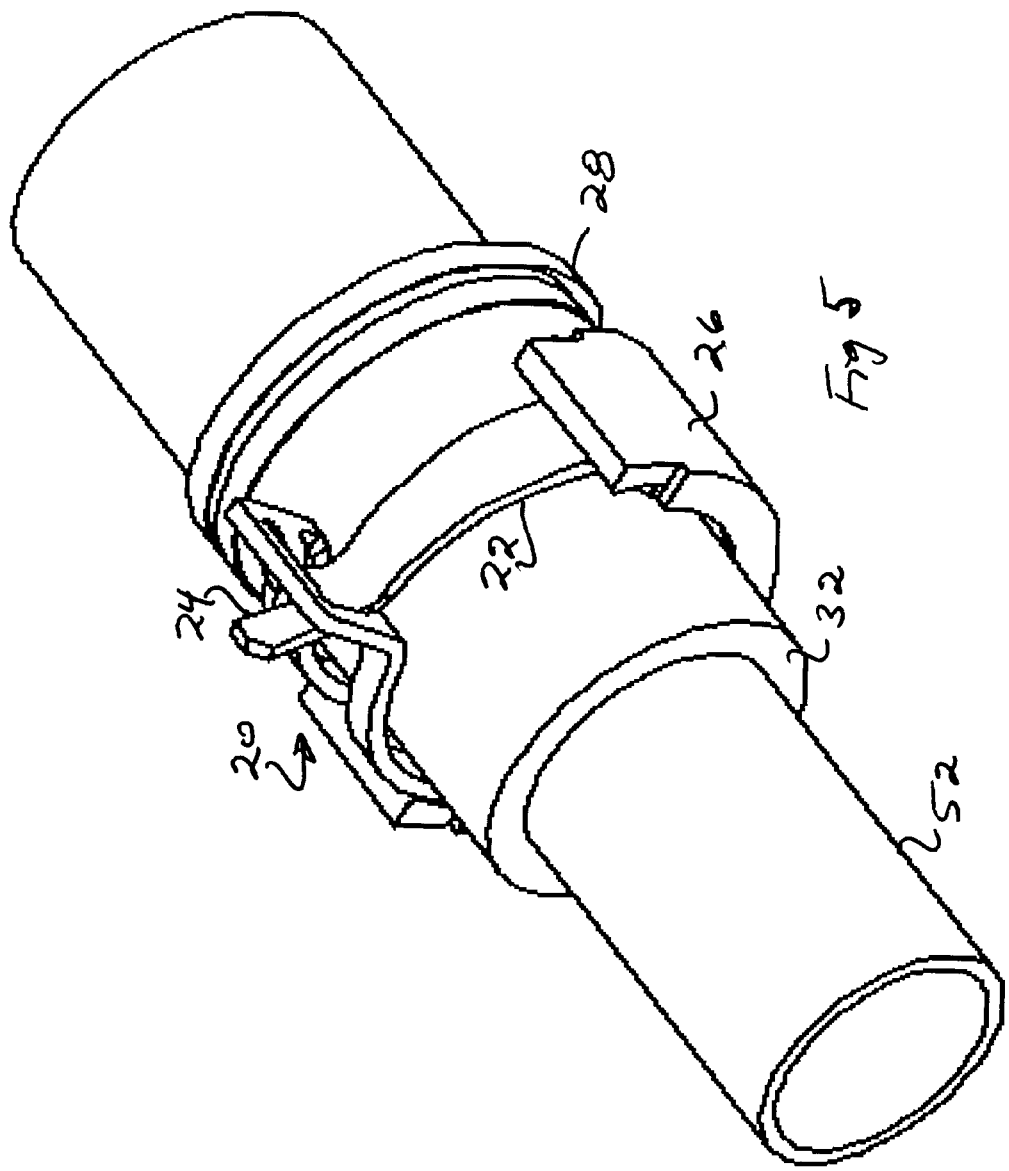

CLAMP RETENTION DEVICE

FIELD OF THE INVENTION

This invention relates to securing deformable hoses on rigid tubular fittings such as those found in automobile engines to provide fluid flow. More particularly, the invention relates to a hose clamp retention device to position and retain a clamp on a hose ready to be activated after the hose has been positioned over one of the rigid tubular fittings.

BACKGROUND OF THE INVENTION

It has become common practice to pre-assemble clamps on a hose and provide this assembly to the automobile assembly line. The clamps are typically placed on the hose and either glued in position or held in place by a clamp retention device which engages the hose to hold the clamp in place. The clamp is then in place to be released closed into a condition to apply a radial compressive load on the hose.

An example of such a clamp retention device is found in U.S. Pat. No. 5,675,871. Typically, such devices are arranged about the clamp at the location of the clamp on the hose. Consequently, when the hose is pushed on to a rigid tubular fitting, the hose must be free to expand slightly and this expansion can be impeded by the mechanical device. This is because the device usually applies some form of radial compression on the hose in order to hold the device, and hence the clamp, in place on the hose.

In U.S. Pat. No. 5,915,739, a clamp retention device is provided to minimize the effect of a clamp retaining structure on the normal procedure for placing a prestressed open clamp on a hose and then engaging the hose on a rigid tubular fitting. The device extends generally about a longitudinal axis and has a retainer and a locator spaced axially from the retainer in side-by-side relationship. The locator and retainer are coupled together and the locator holds the clamp while the retainer engages the hose to maintain the device in position on the hose. In a preferred embodiment, the retainer comprises a belt having a toothed piece at a free end which is selectively engageable with a rectangular opening at another end of the belt. The toothed piece must pass through the opening and find a tooth that applies the necessary compressive load to affix the belt in position.

An object of this invention is to facilitate assembly of the device on a rigid tubular fitting without having the added difficulty of assembling a retainer to maintain the device in position on the hose.

SUMMARY OF THE INVENTION

A retention device is provided for positioning and retaining an open, generally cylindrical hose clamp on a selected hose. The device extends generally about a longitudinal axis and has a retainer and a locator spaced axially from the retainer in side-by-side relationship. The locator and retainer are coupled together and the locator is adapted to hold the clamp while the retainer is adapted to engage the hose to maintain the device in position on the hose. The retainer comprises a pair of looped generally cylindrical hose engaging elements terminating at respective free ends so that the elements are cantilevered to extend in opposite directions from a connecting web.

In accordance with a preferred embodiment of the invention, the clamp locator is generally cylindrical and arranged about a first axis, the hose engaging elements being arranged abut a second axis radially spaced from said first axis toward said connecting web.

BRIEF DESCRIPTION OF THE DRAWINGS

The invention will be better understood with reference to the accompanying drawings in which:

FIG. 4 is an exploded view of the device being assembled with a clamp, a hose and a rigid tubular fitting; and FIG. 5 is a perspective view showing the device and clamp assembly coupled to a hose and rigid tubular fitting.

BRIEF DESCRIPTION OF THE PREFERRED EMBODIMENT

Figure 1:
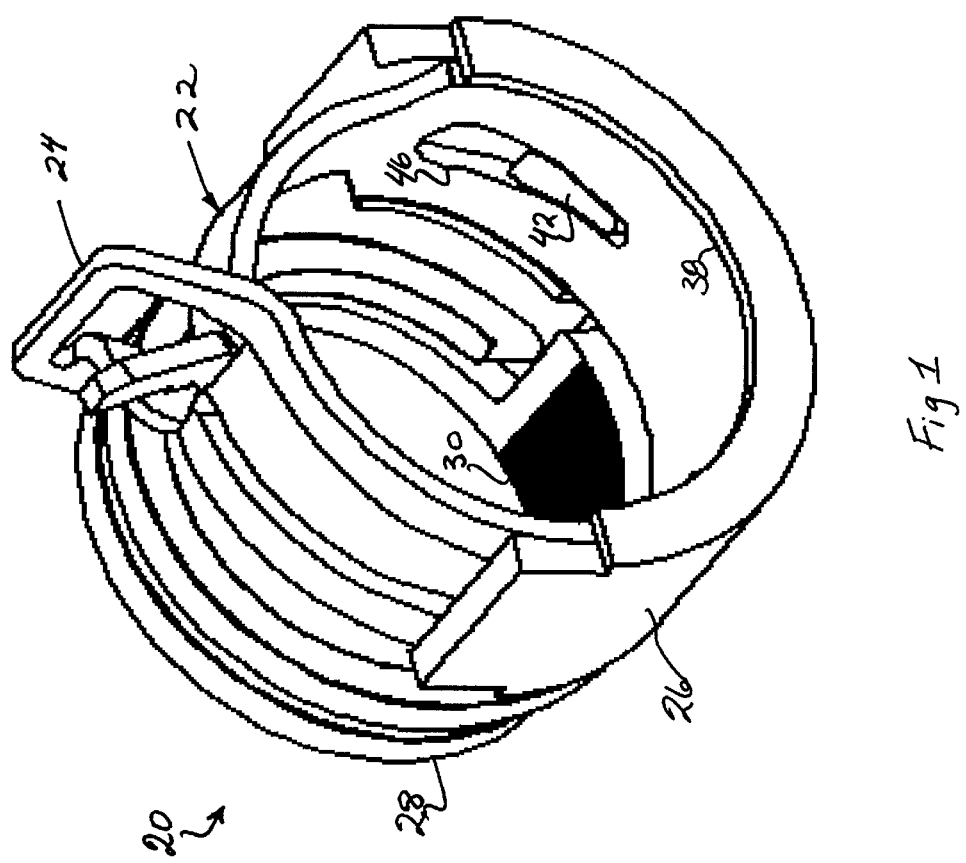
FIG. 1 is a perspective view of a device according to a preferred embodiment of the invention and shown in use with an exemplary pre-stressed clamp.

Reference is first made to FIG. 1 which illustrates an injection molded hose clamp retention device indicated generally by the numeral 20 and containing an exemplary hose clamp indicated generally by the numeral 22. The hose clamp is generally cylindrical and is of the pre-stressed type incorporating a latch structure 24 to hold the clamp in an open position for engagement over a hose. It will be evident from the following description that the hose clamp is exemplary of a variety of clamps and that the retention device can be used with any such clamps.

Figure 2:
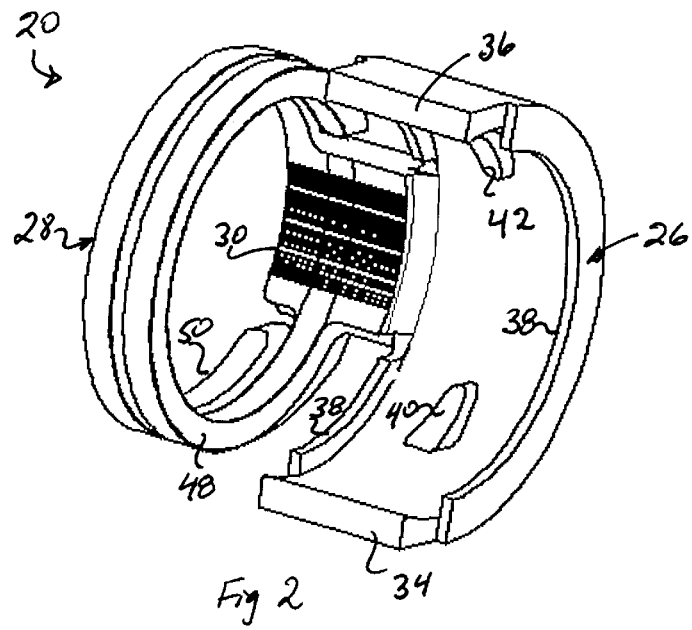
FIG. 2 is a perspective view of the device according to a preferred embodiment of the invention shown without a clamp.
Figure 3:
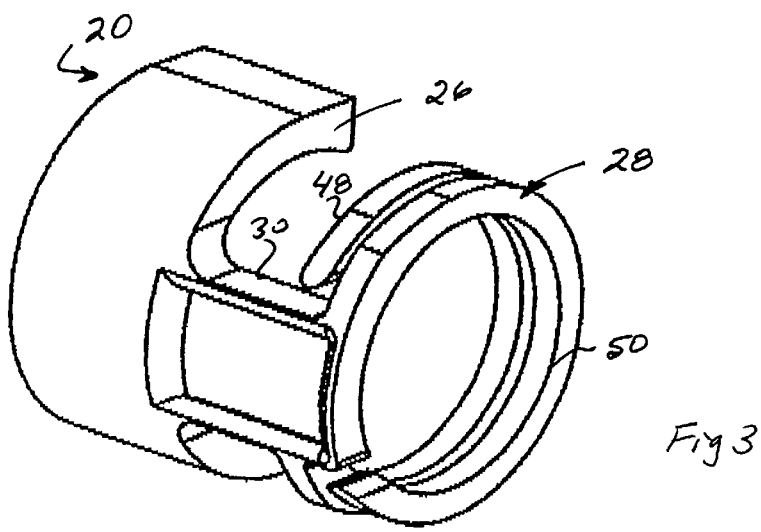
FIG. 3 is a similar view to FIG. 1 viewed from a different angle.

The retention device 20 shown in FIGS. 2 and 3 without a clamp consists essentially of a locator 26, a retainer 28 and a connecting web 30 coupling the locator 26 to the retainer 28 in side-by-side relationship. The locator 26 is generally C-shaped and is proportioned to be a snap-fit on the clamp 22. In use, the retainer 28 attaches the device to a hose 32 (FIG. 4).

The device extends generally about a longitudinal axis and the locator 26 and retainer 28 are spaced axially from one another and arranged in side-by-side relationship. The web 30 extends axially. C-shaped locator 26 terminates in free ends 34, 36 (FIG. 2) spaced from each other to define a gap for receiving the clamp 22 and arranged about a first axis. The gap is smaller than an internal diameter of the locator so that the clamp can be pushed through the gap and gripped by the locator with the latch structure 24 on the clamp 22 extending through the gap. A radially inwardly projecting lip 38 is disposed on forward and trailing edges of the locator 26. For further location, a pair of inwardly extending projections 40, 42 are provided on an inwardly facing surface of the locator 26 for engagement in respective openings 44, 46 formed in the clamp. Consequently, when the clamp 22 is engaged in the locator 26 by deforming the locator to receive the clamp, the projections 40, 42 locate the clamp angularly with respect to the locator, and the lip 38 prevents axial movement. As mentioned previously, the exemplary clamp 22 is in an expanded or open condition retained in this form by the latch structure 24 ready to be released into a deployed position. However, other types of clamps can be accommodated for conventional actuation.

The retainer 28 has a pair of generally cylindrical hose engaging elements 48, 50 disposed side-by-side and which form open loops to terminate at respective free ends so that the elements are cantilevered to extend in opposite directions from the connecting web 30. Thus, proximate loop element 48 which is closest to the clamp locator 26 extends away from the connecting web 30 in a counter-clockwise direction (as drawn in FIG. 2) and has a free end spaced from the web 30 by a small separation sufficient to allow the loop 78 to flex about a respective second axis spaced from the first axis for the clamp locator 26. Conversely, distal loop element 50 which is furthest away from the clamp locator 26 extends from the connecting web 30 in a clockwise direction (as drawn in FIG. 2) and has a free end spaced from the web 30 to allow the loop 50 to flex abut said second axis. It will be noted that the connecting web 30 is positioned to lie on a side of the first axis which is opposite to the gap separating the free ends 34, 36 of the clamp locator 26 and that the second axis lies closer to the connecting web. In this way, when the loop elements 48, 50 apply a load to the hose 32, the hose 32 is pushed away from the gap and into contact with the clamp. It will be understood that the web 30 is subject to some radial stress and that the material of construction (preferably Polypropylene® or glass-filled Polypropylene®) is selected to minimize failure resulting from flexing, the dimensional attributes being appropriate to maximize strength.

Assembly of the device 20 on a hose 32 will next be described with reference being made to FIGS. 4 and 5. The hose 32 is received in the device 20 with the clamp 22 snapped into the generally C-shaped locator 26. This locator extends radially about the clamp 22 with respect to the first axis such that the clamp is retained within the locator 26. The hose 32 and clamp 22 are selected so that the hose 32 will slide through the clamp 22 as is common in the art. The assembly with the clamp is positioned relative to the end of the hose 32 by pushing the loop elements 48, 50 into engagement with the hose 32 until they are spaced a selected distance from the end of the hose.

The axial spacing and side-by-side relationship of the locator 26 and retainer 28 is established by the web 30. The length of the web 30 is chosen to create a selected separation between the proximal loop element 48 and the locator 26 sufficient to position the retainer 28 so that it does not have to expand over the rigid tubular fitting.

It will be evident that when the hose 32 is engaged over a rigid tubular fitting 52, the position of the clamp 22 on the hose should be such that when the engagement takes place, the clamp 22 will compress the hose 32 between the fitting 52 and the clamp 22. After the engagement on the fitting 52 is completed, the clamp 22 is deployed in the usual fashion so that the energy stored in the clamp compresses the hose 32 about the fitting 52.

It will be evident that the separation between the locator 26 and the retainer 28 is such that there is little likelihood of the clamp 22 being misaligned on a hose 32. In other words, the clamp 22 is naturally maintained in a generally orthogonal position with reference to the axis of the hose 32 to ensure full orthogonal implementation of the clamp when it is deployed.

The retention device 20 has been described as a one-piece injection molded structure. Clearly, the device can be manufactured differently and take many forms within the scope of the invention. All such variations will be evident to persons skilled in the art and are within the scope of the invention as claimed.

What is claimed is:

1. A device for positioning and retaining an open generally cylindrical hose clamp on a selected hose in preparation for engaging the hose over a rigid tubular fitting, the device including:
    a locator for receiving and holding the open hose clamp with the clamp disposed about a first axis;
    a retainer having a pair of looped generally cylindrical hose engaging elements; and
    a connecting web coupling the locator to the retainer in spaced side-by-side relationship, the hose engaging elements being disposed side-by-side about a second axis, the elements terminating at respective free ends and cantilevered to extend in opposite directions from said connecting web so as to overlap.

2. Device according to claim 1 in which the locator is C-shaped having opposed free ends defining a gap and arranged on said first axis, the second axis being parallel to the first axis and spaced from the first axis toward said connecting web and away from the gap.

3. An assembly for coupling a rigid tubular fitting to a hose to provide fluid flow therebetween, the assembly having:
    an elongate hose having first and second ends for engagement over said tubular fitting;
    a clamp in an open condition and positioned to slide freely on the hose and provide clearance for radial outward deflection of the hose; and
    a device for positioning and retaining the open clamp near one of the ends of the hose ready to be deployed to compress the hose on said tubular fitting, the device including a locator for receiving and holding the open hose clamp with the clamp disposed about a first axis, a retainer having a pair of looped hose engaging elements and a connecting web coupling the locator to the retainer in spaced side-by-side relationship, the hose engaging elements being disposed side-by-side about a second axis, the elements terminating at respective free ends and cantilevered to extend in opposite directions from said connecting web so as to overlap.

4. An assembly according to claim 3, in which the locator is C-shaped having opposed free ends defining a gap and arranged on said first axis, the second axis being parallel to the first axis and spaced from the first axis toward said connecting web and away from the gap.

* * * * *